United States Patent
Hanson

(10) Patent No.: US 6,577,460 B1
(45) Date of Patent: Jun. 10, 2003

(54) METHOD AND APPARATUS FOR IMPROVING TRACK FORMAT EFFICIENCY IN A DIRECT ACCESS STORAGE DEVICE

(75) Inventor: Weldon Mark Hanson, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/516,100

(22) Filed: Mar. 1, 2000

(51) Int. Cl.[7] ................................................ G11B 5/09
(52) U.S. Cl. ........................................... 360/40; 360/48
(58) Field of Search ............................. 360/39, 40, 46, 360/48

(56) References Cited

U.S. PATENT DOCUMENTS

| | | |
|---|---|---|
| 4,974,197 A | 11/1990 | Blount et al. |
| 5,133,060 A | 7/1992 | Weber et al. |
| 5,210,660 A | 5/1993 | Hetzler |
| 5,237,675 A | 8/1993 | Hannon, Jr. |
| 5,283,646 A | 2/1994 | Bruder |
| 5,341,249 A * | 8/1994 | Abbott et al. .................. 360/39 |
| 5,341,387 A | 8/1994 | Nguyen |
| 5,343,340 A | 8/1994 | Boutaghou et al. |
| 5,388,013 A | 2/1995 | Nakamura |
| 5,442,492 A | 8/1995 | Cunningham et al. |
| 5,535,369 A | 7/1996 | Wells et al. |
| 5,619,539 A | 4/1997 | Coker et al. |
| 5,689,532 A | 11/1997 | Fitzpatrick |
| 5,742,443 A | 4/1998 | Tsao et al. |
| 5,857,002 A | 1/1999 | Melas |
| 5,911,150 A | 6/1999 | Peterson et al. |
| 5,949,831 A | 9/1999 | Coker et al. |
| 6,366,418 B1 * | 4/2002 | McEwen et al. .............. 360/46 |

* cited by examiner

Primary Examiner—David Hudspeth
Assistant Examiner—Varsha A. Kapadia
(74) Attorney, Agent, or Firm—Crawford & Maunu, PLLC; Mark A. Hollingsworth

(57) ABSTRACT

An apparatus and method for transferring data between a read/write transducer and a data storage medium provides for improved track format efficiency. Data is written to a data sector of the data storage medium using a write current waveform developed in the read/write transducer. The write current waveform is typically at one of several possible states following writing of the data to the data sector. According to the present invention, a transition pattern is generated and used for transitioning the write current waveform from the state following writing of the data to a known state consistent with coding constraints of the data channel. A predetermined data pattern associated with the known state of the write current waveform is written to a pad field of the data sector. The transition pattern and the predetermined data pattern are used to resolve detector and parity post-processor closure decisions during a sector read operation.

23 Claims, 16 Drawing Sheets

METHOD AND APPARATUS FOR IMPROVING TRACK FORMAT EFFICIENCY IN A DIRECT ACCESS STORAGE DEVICE

FIELD OF THE INVENTION

The present invention relates generally to data storage systems and, more particularly, to a system and method for improving track format efficiency in a data storage device.

BACKGROUND OF THE INVENTION

A typical data storage system includes a magnetic medium for storing data in magnetic form and a transducer used to write and read magnetic data respectively to and from the medium. A typical disk storage device, for example, includes one or more data storage disks coaxially mounted on a hub of a spindle motor. The spindle motor rotates the disks at speeds typically on the order of several thousand revolutions-per-minute (RPM).

Digital information is typically stored in the form of magnetic transitions on a series of concentric, spaced tracks formatted on the surface of the magnetizable rigid data storage disks. The tracks are generally divided into a number of sectors, with each sector comprising a number of information fields, including fields for storing data, and sector identification and synchronization information, for example.

An actuator assembly typically includes a plurality of outwardly extending arms with one or more transducers and slider bodies being mounted on flexible suspensions. The slider body lifts the transducer head off the surface of the disk as the rate of spindle motor rotation increases, and causes the head to hover above the disk on an air bearing produced by high speed disk rotation. The distance between the head and the disk surface is typically on the order of 40–100 nanometers (nm).

In a typical data storage device, such as a direct access storage device (DASD) or other magnetic or optical storage device, data is typically stored in data sectors. In addition to storing customer data, each data sector typically includes a number of fields that store specific types of information which facilitate recovery of customer data during the readback process. Such fields may include one or more synchronization fields, an error correction code (ECC) field, a cyclic redundancy code (CRC) field, and a pad field.

Conventional data channel detector implementations typically require additional data or "pad" to be written to a data sector following writing of the customer data and ECC fields in order to allow the channel's detector to decode the last bytes of data written to the sector. The purpose of the pad is to provide sample values to the channel's detector and/or parity circuits for purposes of resolving pending decisions at the end of a data read operation.

It can be appreciated that inclusion of various sync, ECC, and pad fields in each data sector reduces the available capacity for storing customer data on a data storing medium. Although necessary for recovering customer data using conventional approaches, these fields reduce the efficiency of storing customer data. Elimination or reduction of the length of these fields would result in improved format efficiency and allow more customer data to be stored to the media per unit area.

There is a need for an improved data storage formatting approach which provides for increased data sector format efficiency. There exists a further need for such an approach that provides for increased customer data storage capacity, and one that allows designers to implement more efficient coding schemes without incurring loss of format efficiency due to the requirement to add longer pad at the end of a data sector. The present invention fulfills these and other needs.

SUMMARY OF THE INVENTION

The present invention is directed to an apparatus and method for transferring data between a read/write transducer and a data storage medium which provide for an improvement in track format efficiency. A track formatting methodology of the present invention involves writing, using a write current waveform developed in the read/write transducer, data to a data sector of the data storage medium. The data is typically customer data.

According to the present invention, a transition pattern is generated and used for transitioning the write current waveform from the state following writing of the data to a known state consistent with coding constraints of the channel. A predetermined data pattern associated with the known state of the write current waveform is written to a pad field of the data sector. The transition pattern and the predetermined data pattern are used to resolve detector and parity post-processor closure decisions during a sector read operation.

The generated transition pattern is used for transitioning the write current waveform to a known state consistent with coding requirements of the channel. The coding constraints typically include parity constraints and precoder constraints. The predetermined data pattern typically includes a data pattern, such as a synchronization or repeating data pattern, that facilitates detector and parity post-processor closure decisions. For example, the predetermined data pattern may constitute a pattern of all logical ones or all logical zeros.

An apparatus for transferring data to and from a data storage medium according to the present invention includes a controller coupled to an interface for receiving customer data. The apparatus further includes a data channel comprising a write circuit, and a read/write transducer coupled to the data channel.

A write coding circuit, which is coupled to the controller and the write circuit, switches write current of the read/write transducer to code the data according to a selected partial response signaling format when writing the data to a data sector of the data storage medium. The write coding circuit generates a transition pattern used for transitioning the write current from the state following writing of the data to a known state consistent with coding constraints of the channel. The read/write transducer writes a predetermined data pattern associated with the known state of the write current to a pad field of the data sector.

The write coding circuit typically codes the data according to a partial response class-4 signaling format or an extended partial response class-4 signaling format. The write coding circuit typically includes an encoder and a precoder, wherein the coding constraints are consistent with coding requirements of the encoder and precoder. The data channel also includes a parity post-processor, wherein the coding constraints are consistent with parity requirements of the parity post-processor.

The data channel may further include a detector in addition to a parity post-processor, wherein the predetermined data pattern includes a data pattern that facilitates detector and parity post-processor closure decisions. According to one embodiment, the parity post-processor and detector use the transition and predetermined data patterns to resolve block code constraints and detector decisions, respectively, at the end of a sector read operation. The predetermined data pattern is typically a synchronization data pattern or a repeating data pattern, such as a data pattern including all logical ones or all logical zeros.

According to a yet another embodiment, a data storing system includes a data storage disk, a number of transducers each supported by a support structure in proximity with the disk, and an actuator that provides relative movement between the transducers and the disk. The data storing system further includes circuitry for transferring data to and from a data storage disk. The circuitry includes a controller coupled to an interface for receiving customer data and a write circuit coupled to a read/write transducer. A write coding circuit, which is coupled to the controller and the write circuit, facilies implementation of a track formatting methodology as described above.

The above summary of the present invention is not intended to describe each embodiment or every implementation of the present invention. Advantages and attainments, together with a more complete understanding of the invention, will become apparent and appreciated by referring to the following detailed description and claims taken in conjunction with the accompanying drawings.

Figure 1:
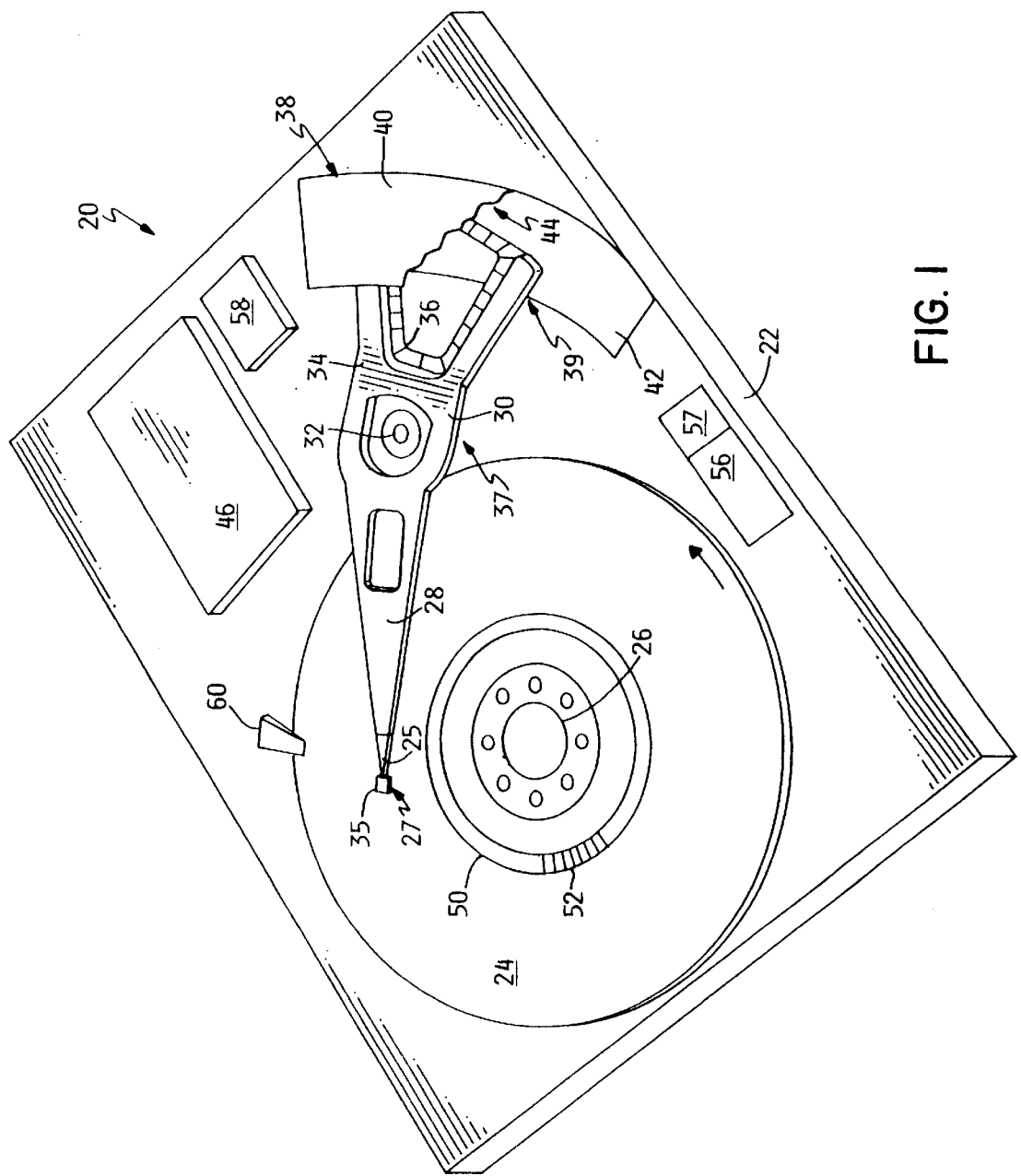
FIG. 1 is a top perspective view of a disk drive system with its upper housing cover removed.

While the invention is amenable to various modifications and alternative forms, specifics thereof have been shown by way of example in the drawings and will be described in detail hereinbelow. It is to be understood, however, that the intention is not to limit the invention to the particular embodiments described. On the contrary, the invention is intended to cover all modifications, equivalents, and alternatives falling within the scope of the invention as defined by the appended claims.

DETAILED DESCRIPTION OF VARIOUS EMBODIMENTS

In the following description of the illustrated embodiments, references are made to the accompanying drawings which form a part hereof, and in which is shown by way of illustration, various embodiments in which the invention may be practiced. It is to be understood that other embodiments may be utilized, and structural and functional changes may be made without departing from the scope of the present invention.

Figure 2:
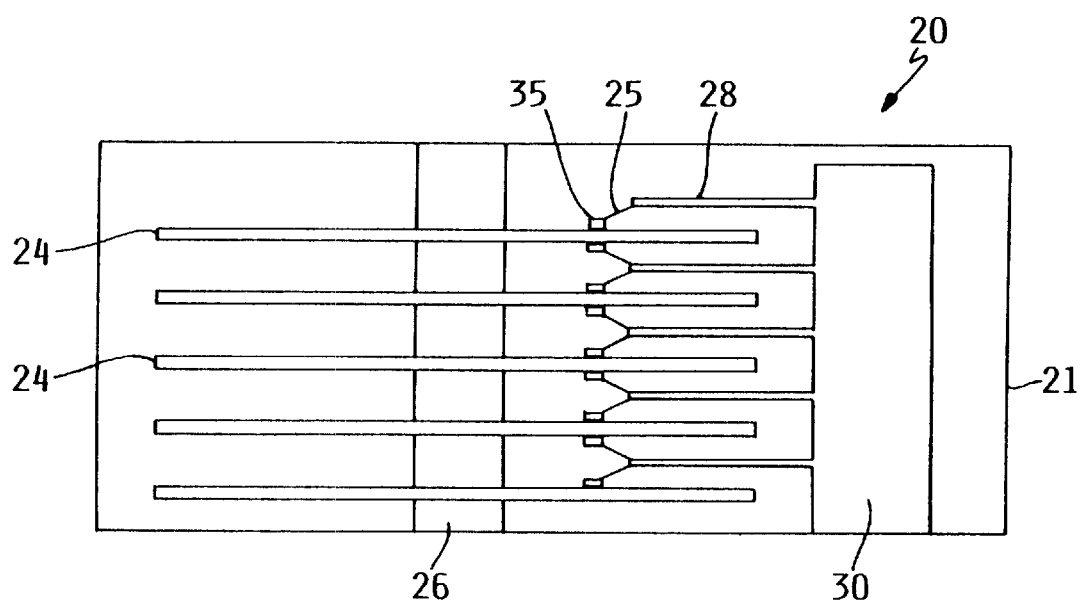
FIG. 2 is a side plan view of a disk drive system comprising a plurality of data storage disks.

Referring to the drawings, and more particularly to FIGS. 1 and 2, there is illustrated a data storage system 20 within which a method and apparatus for improving track format efficiency according to the present invention may be implemented. The disk drive system 20, as is best shown in FIG. 2, typically includes one or more rigid data storage disks 24 which are stacked coaxially in a tandem spaced relationship, and rotate about a spindle motor 26 at a relatively high rate of rotation.

As is depicted in FIG. 1, each disk 24 is typically magnetically formatted to include a plurality of spaced concentric tracks 50. One or more of the disks 24 may alternatively be magnetically formatted to include a spiraled track configuration, or a combination of concentric and spiraled track configurations. Digital information is typically stored in the form of magnetic transitions along the tracks 50. The tracks 50 are generally divided into a number of sectors 52, with each sector 52 comprising a number of information fields, including fields for storing data, and sector identification and synchronization information, for example.

Writing data to a magnetic data storage disk 24 generally involves passing a current through the write element of the transducer assembly 27 to produce magnetic lines of flux which magnetize a specific location of the disk surface 24. Reading data from a specified disk location is typically accomplished by a read element of the transducer assembly 27 sensing the magnetic field or flux lines emanating from the magnetized locations of the disk surface 24. As the read element passes over the rotating disk surface 24, the interaction between the read element and the magnetized locations on the disk surface 24 results in the production of electrical signals, commonly referred to as readback signals, in the read element.

An actuator 30 typically includes a number of interleaved actuator arms 28 with each arm having one or more transducer 27 and slider assemblies 35 mounted to a load beam 25 for transferring information to and from the data storage disks 24. The slider 35 is typically designed as an aerodynamic lifting body that lifts the transducer 27 off the surface of the disk 24 as the rate of spindle motor rotation increases and causes the transducer 27 to hover above the disk 24 on an airbearing produced by high speed rotation of the disk 24. The distance between the slider 35 and the disk surface 24 is typically on the order of 40–100 nm.

The actuator 30 is typically mounted to a stationary actuator shaft 32 and rotates on the shaft 32 to move the actuator arms 28 into and out of the stack of data storage disks 24. A coil assembly 36, mounted to a coil frame 34 of the actuator 30, generally rotates within a gap 44 defined between the upper and lower magnet assemblies 40 and 42 of a permanent magnet structure 38 causing the actuator arms 28, in turn, to sweep over the surface of the data storage disks 24. The spindle motor 26 typically comprises a DC motor energized by a power supply 46 and adapted for rotating the data storage disks 24.

The coil assembly 36 and the upper and lower magnet assemblies 40 and 42 of the permanent magnet structure 38 operate in cooperation as an actuator voice coil motor 39 responsive to control signals produced by a servo processor 56. The servo processor 56 controls the direction and magnitude of control current supplied to the voice coil motor 39. The actuator voice coil motor 39 produces a torquing force on the actuator coil frame 34 when control currents of varying direction and magnitude flow in the coil assembly 36 in the presence of a magnetic field produced by the permanent magnet structure 38. The torquing forces imparted on the actuator coil frame 34 cause corresponding rotational movement of the actuator arms 28 in directions dependent on the polarity of the control currents flowing in the coil assembly 36.

The data storage system 20 shown in FIG. 1 preferably employs a closed-loop servo control system for positioning the read/write transducers 27 to specified storage locations on the data storage disk 24. During normal data storage system operation, a servo transducer, generally mounted proximate the read/write transducers, or, alternatively, incorporated as the read element of the transducer assembly 27, is typically employed to read information for the purpose of following a specified track (i.e., track following) and locating (i.e., seeking) specified track and data sector locations on the disk surface 24.

In accordance with one servo technique, embedded servo pattern information is written to the disk 24 along segments extending in a direction generally outward from the center of the disk 24. The embedded servo patterns are thus formed between the data storing sectors of each track 50. It is noted that a servo sector typically contains a pattern of data, often termed a servo burst pattern, used to maintain optimum alignment of the read/write transducers 27 over the centerline of a track 50 when transferring data to and from specified data sectors on the track 50. The servo information may also include sector and track identification codes which are used to identify the location of the transducer assembly 27.

The servo processor 56, which cooperates with channel electronics 57, regulates the actuator voice coil motor 39 to move the actuator arms 28 and transducers 27 to prescribed track 50 and sector 52 locations when reading and writing data to and from the disks 24. The servo processor 56 is loosely coupled to a disk drive controller 58. The disk drive controller 58 typically includes control circuitry and software that coordinate the transfer of data to and from the data storage disks 24. Although the servo processor 56 and disk drive controller 58 are depicted as two separate devices in FIG. 1, it is understood that the functionality of the servo processor 56 and disk drive controller 58 may be embodied in a single multi-purpose processor, which typically results in a reduced component cost.

An apparatus and method in accordance with the principles of the present invention generally provide for improved track format efficiency in a direct access storage device by reduction or elimination of the pad field required to complete the read operation. The pad field typically contains the remainder of an encode/decode block including information required to complete parity correction to the block and also additional bytes required for completion of the data detection operation including finalizing pending decisions within the detector (e.g., Viterbi detector) logic. An apparatus and method according to the present invention are well suited for implementation in-situ a disk drive system of the type described above with reference to FIGS. 1 and 2, it being understood that the invention is not limited to the operating environment described in the above discussion or that provided hereinbelow.

According to the principles of the present invention, logic is preferably added to the data channel which resolves the transitions at the end of a data sector during the write process to a known pattern or state, which, according to one embodiment, allows for the substitution of samples to the data channel detector (e.g., Viterbi detector) during readback in lieu of samples from the pad field. According to another embodiment, separate parity logic provides for the substitution of samples to the data channel detector during readback in lieu of samples from the pad field, which provides for early ending of parity usage in comparison to conventional approaches. A preferred implementation requires that one or two bytes of pad data following the ECC field be determined at the time that customer data is written, which would allow a pad of reduced length to be written to a known state which meets detector and parity block encode constraints. Since the pad data as described is predetermined to a known state, a significant portion of the pad otherwise required in conventional schemes can be eliminated by instead using substituted values within the logic to resolve pending parity and decoding decisions at the end of the sector read operation.

Figure 3:
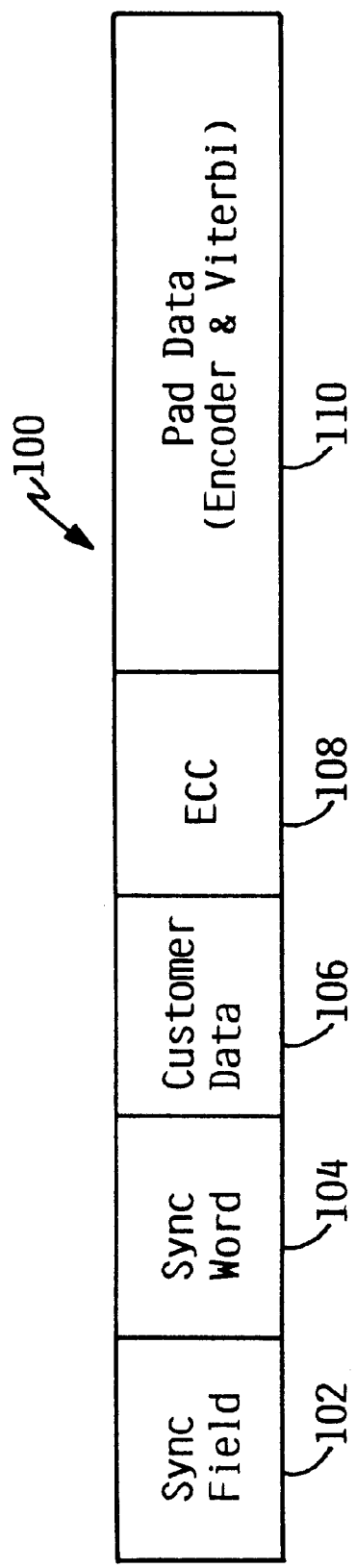
FIG. 3 illustrates various fields of a data sector which may conform to a track formatting configuration of the present invention.

Referring now to FIG. 3, there is depicted a typical data sector 100 of a data track provided on a data storage disk. Data is written to a data storage disk according to a sequential format. The data sector 100 shown in FIG. 3, for example, includes a sync field 102, which includes synchronization patterns that allow the channel VFO to acquire the clock frequency, and a sync word 104, which includes a pattern that identifies the start of the customer data. Customer data is stored in a customer data field 106. Error correction code (ECC) is stored in an ECC field 108 toward the end of the data sector 100, which provides the capability to correct errors that occur within the sector 100.

Data sector 100 further includes a pad field 110 which is used to complete readback signal decoding for customer data patterns. Present data channel detector implementations typically require additional data, generally referred to herein as pad, to be written after the customer data and ECC fields 106, 108 to allow the channel's detector to decode the last bytes of data written to the data storage disk. In general terms, the purpose of the pad data is to provide sample values to the channel's Viterbi (trellis) and/or parity circuits to resolve pending decisions at the end of a data read operation.

It can be appreciated that data storage on a DASD or other magnetic or optical recording device requires the various sync, ECC, and pad fields, such as those depicted in FIG. 3, be written to the media to allow recovery of the data during the readback process. As discussed previously, elimination or reduction of the length of these fields would improve the format efficiency and allow for more customer data to be stored on the media per unit area.

A data track formatting methodology of the present invention advantageously reduces the length of pad required at the end of a data sector to complete readback signal decoding for customer data patterns. In doing so, the format efficiency of a data sector is improved and allows designers to implement more efficient coding schemes without incurring loss of format efficiency due to the requirement to add longer pad at the end of a data sector.

Significant improvement in track format efficiency may be realized by implementing the present invention for track formats having increased block sizes. Reducing or eliminating the channel's pad requirement eliminates or significantly shortens the process of completing the read operation by resolving pending decisions and parity closure carried into a subsequent read operation (i.e., reduces pipelining required, especially in cases where there exists longer latency in the readback process). These and other advantages will be readily appreciated by those skilled in the art, as further exemplified in the following discussion.

In accordance with one illustrative data sector configuration, sync field 102 shown in FIG. 3 is 20 bytes in length, while the sync word field 104 is 4 bytes in length. The customer data field 106 is 512 bytes in length, and the ECC field 108 is 34 bytes in length. The pad data field 110 is 9 bytes in total length, with 6 bytes allocated as the encoder pad and 3 bytes allocated as the Viterbi pad. In this illustrative example, the channel employs a 96/104 rate code scheme. Twelve customer bytes are encoded into 13 bytes, including 2 parity bits. The pad requirements for this illustrative example requires 6 bytes of pad data to complete the encode block, then an additional 1–3 bytes for Viterbi trellis closure.

Improvements obtained by implementing a track formatting methodology of the present invention include a reduction in the pad size requirement. In accordance with the present invention, the pad requirements for this illustrative example may be reduced to 2 bits for parity closure and 2 bits for precoder closure to return the write current to a known state. Therefore, the pad region can be contained within 1 customer data byte. In this case, format efficiency improvement may be expressed as the ratio of 571/579, or about 1%. Those skilled in the art will immediately realize that this format efficiency improvement, although apparently small to the uninitiated reader, represents a marked technological improvement and marketable distinction. The degree of format efficiency improvement increases with a corresponding increase in block size.

Figures 12A, 12B:
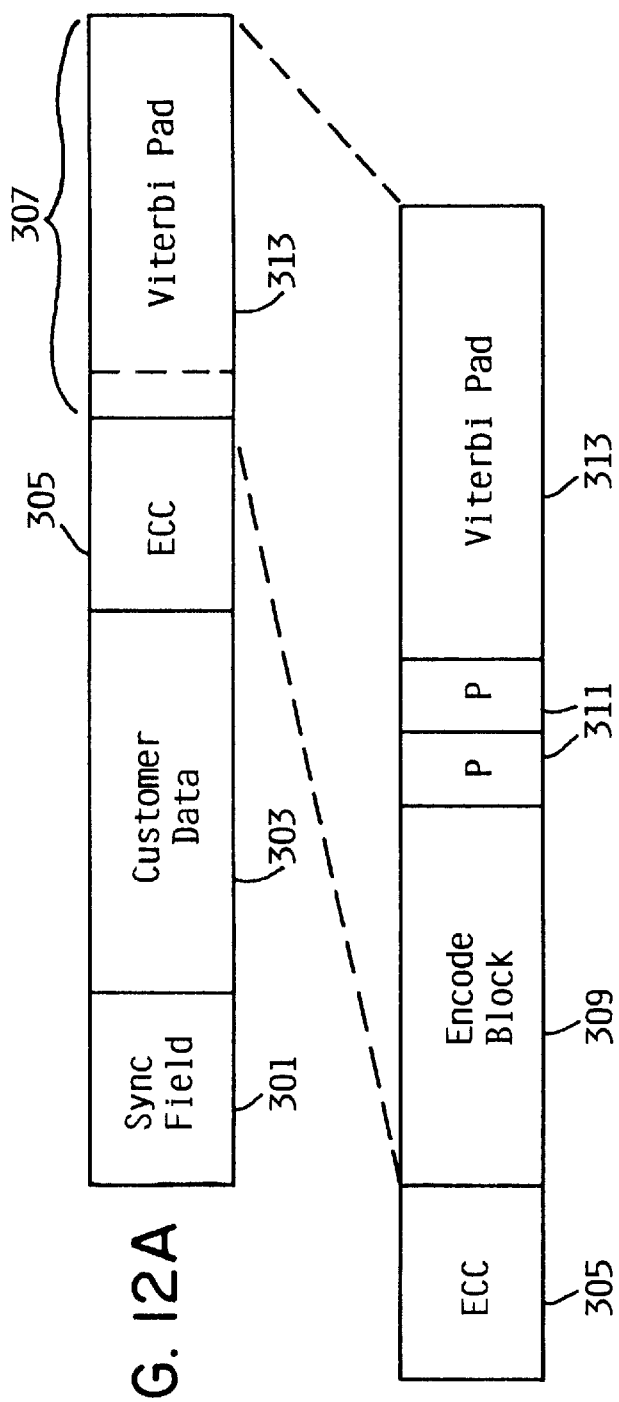
FIGS. 12A–12B illustrate conventional data sector configurations having a pad field of a traditional length.
Figures 13A, 13B:
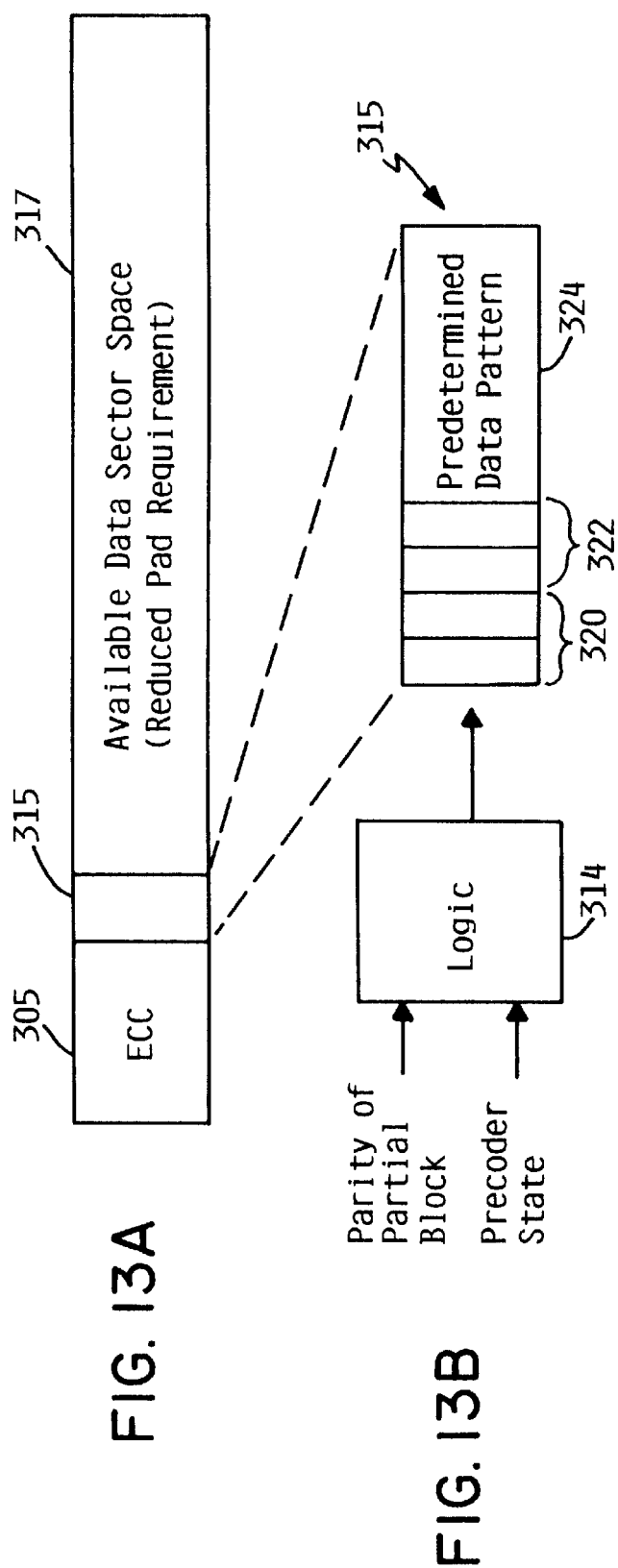
FIG. 13A illustrates a data sector configuration formatted according to the present invention to have a significantly reduced pad field.
FIG. 13B illustrates logic used in the data channel for generating a transition pattern and a predetermined data pattern for resolving detector and parity post-processor closure decisions during a sector read operation.

FIGS. 12 and 13 further demonstrate advantages of the present invention. FIGS. 12A and 12B depict a data sector formatted according to a conventional approach. FIGS. 13A and 13B depict a data sector formatted in accordance with the principles of the present invention which has a significantly reduced pad size in comparison to the conventional data sector shown in FIG. 12.

FIG. 12A shows a portion of a data sector which includes a sync field 301, a customer data field 303, and an ECC field 305. FIG. 12 further depicts a last portion 307 of the data sector which includes a Viterbi pad field 313 and a last encode block, which is shown in greater detail in FIG. 12B. The last encode block depicted in FIG. 12B includes an encode block 309, two parity (P) fields 311, and the Viterbi pad field 313. In the case of a modulo 12 constraint, for example, the encode block 309 includes a partial encode block of 1 byte and an additional 11 bytes which are required to provide parity coverage for the partial encode block.

FIG. 13A includes a last encode block 315 of substantially reduced size relative to that of FIG. 12B. As best shown in FIG. 13B, and assuming a modulo 12 constraint, the last encode block 315 is representative of a parity and precoder closure block having a size of no greater than 1 byte. The last encode block 315 shown in FIG. 13B includes 2 bits 320 to resolve partial encode block parity (based on 4 possible parity states) and two bits 322 to resolve precoder coding constraints (based on 4 possible precoder states). The last encode block 315 further includes a predetermined data pattern 324 generated in a manner described previously.

The values of the parity and precoder state bit fields 320 and 322 are generated by logic 314 consistent with the parity and coding constraints of the data channel. Logic 314 may be coupled to the data channel. In one embodiment, logic 314 may be coupled to or incorporated within a parity post-processor of the data channel, such as parity post-processor 141 shown in FIG. 4.

As can be seen in FIGS. 12 and 13, the data sector of FIG. 13 formatted in accordance with the principles of the present invention provides for a pad field 315 of reduced size over a conventionally formatted data sector. For example, the conventionally formatted data sector shown in FIG. 12 requires 11 bytes of "pad" which is not required in the data sector shown in FIG. 13. In this illustrative example, the 11 bytes of "wasted" pad space per data sector may be made available using a formatting approach of the present invention for purposes of storing customer data or other information.

Figure 4:
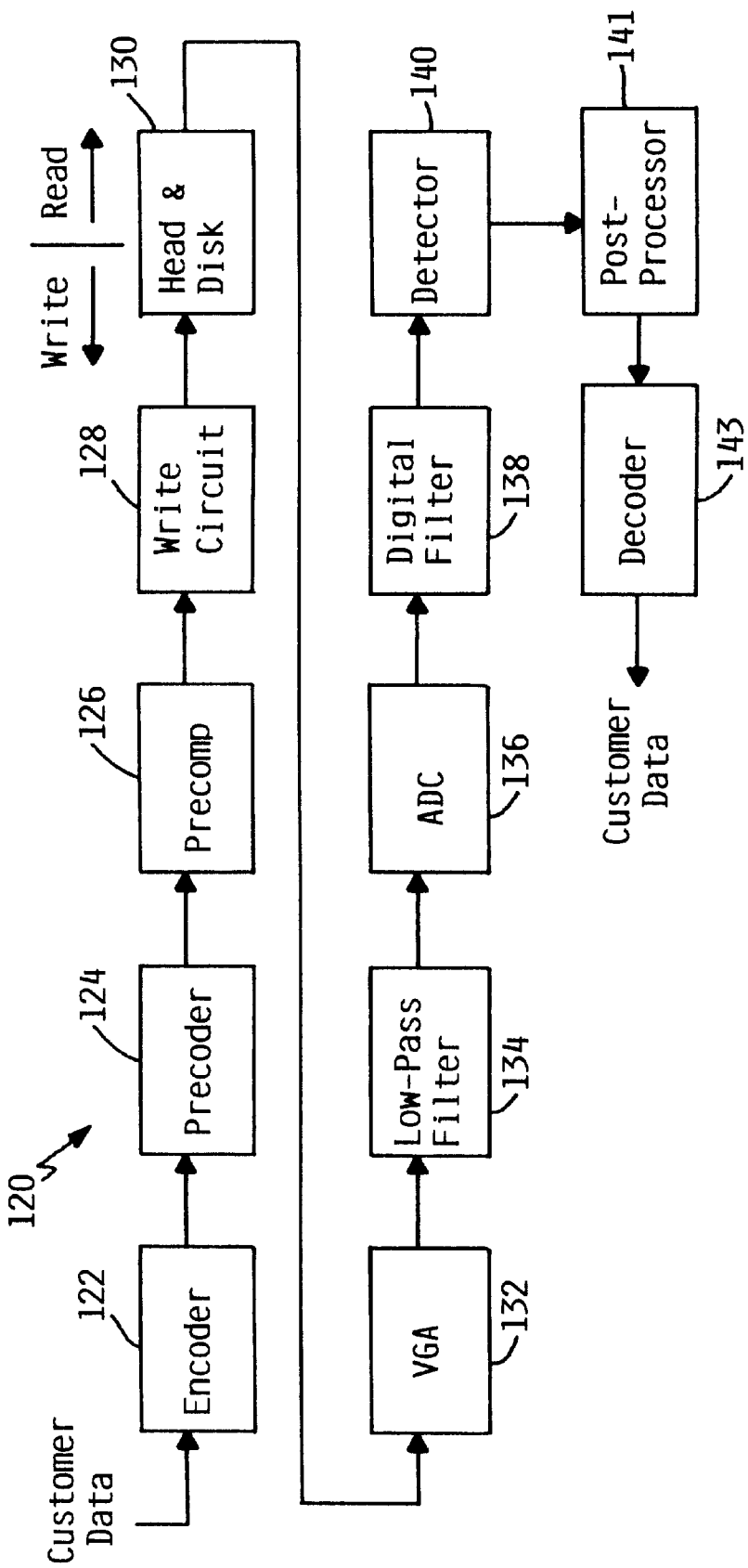
FIG. 4 illustrates various components of a data channel embodying the present invention.

Referring now to FIG. 4, there is illustrated a block diagram of a data channel of a data storage system embodying the present invention. In particular, FIG. 4 shows an embodiment of a partial-response maximum-likelihood (PRML) channel 120 which implements a track formatting methodology in accordance with the principles of the present invention. The channel 120 may be viewed as constituting a portion associated with writing data to a data storage medium and a portion associated with reading data from the medium.

Customer data to be written to the data storage medium is applied to an encoder 122 which encodes the customer data according to a pre-established coding scheme. By way of example, encoder 122 may re-map the customer data to include timing information for purposes of facilitating efficient readback signal processing, improving efficiency, and minimizing error propagation. A 16/17 rate coding scheme may be employed by encoder 122 which encodes 16 customer bits to 17 channel bits to provide the requisite timing information. In such a scheme, the code is 94% efficient and, therefore, the channel's internal circuitry operates at a rate 6% higher of that of the customer data rate passing from the head-disk controller.

Figure 11A:
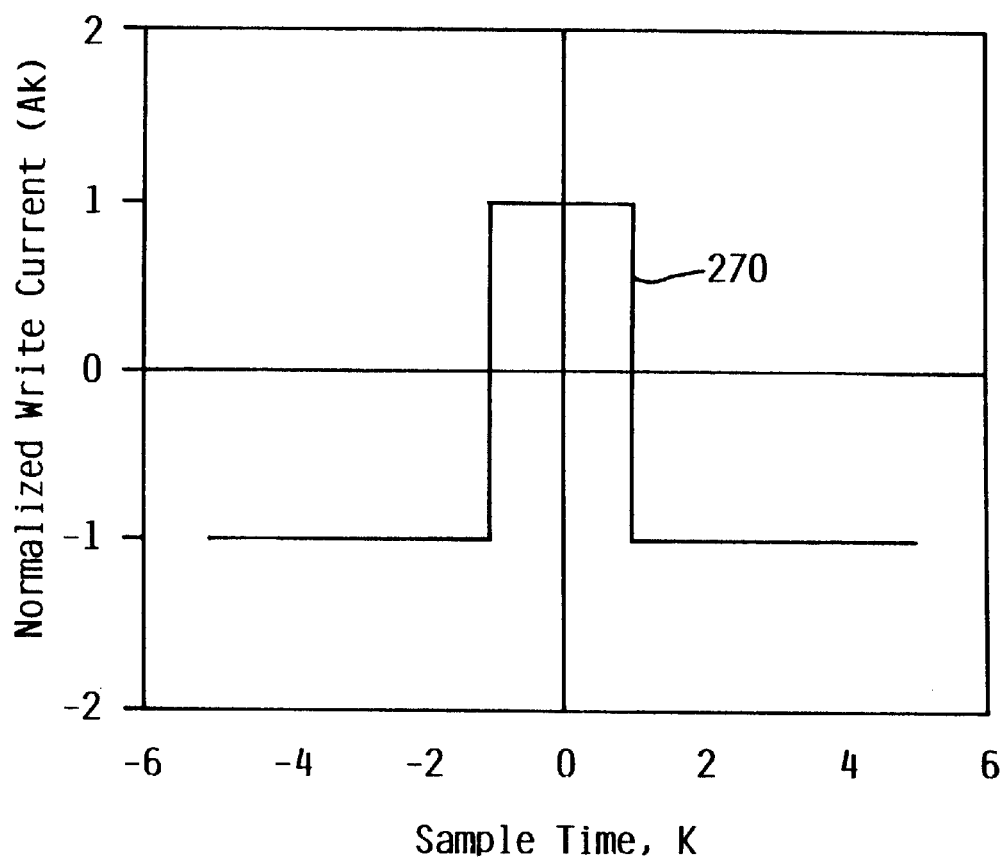
FIG. 11A illustrates a binary write current waveform produced by write precoder circuitry of the present invention.
Figure 11B:
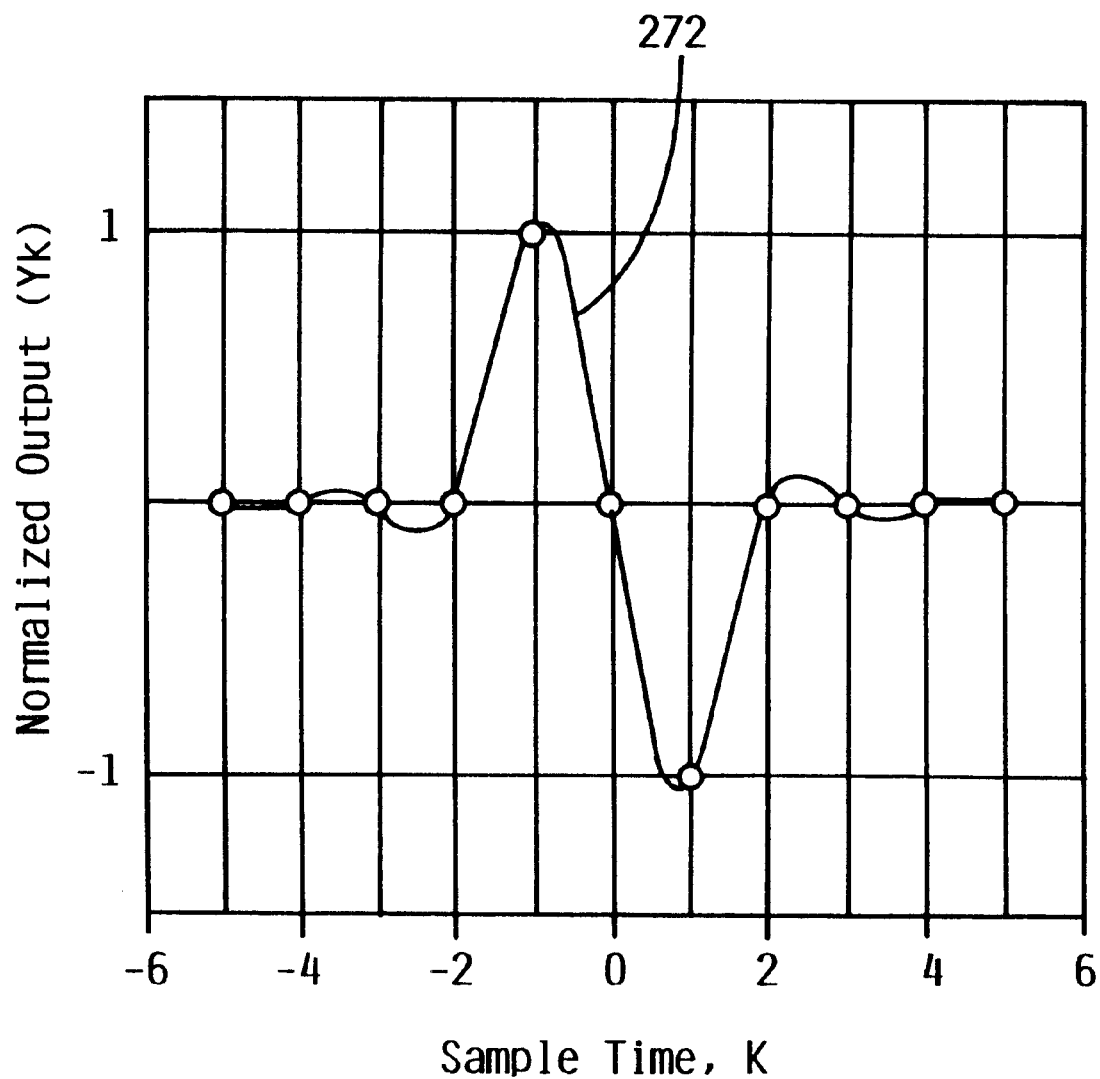
FIG. 11B illustrates an equalized readback signal response from the write current transitions associated with the write current waveform of FIG. 11A.

The encoded customer data communicated from encoder 122 to a precoder 124 then converts the encoded binary customer data to a binary write current waveform signal. FIG. 11A illustrates a write current waveform 270 produced at the output of precoder 124. FIG. 11B illustrates an equalized PR4 (class-4 partial-response) readback signal response from the current transitions associated with the write current waveform of FIG. 11A.

The precoder 124 operates on the encoded customer data to enable the magnetic system to mimic a desired partial-response (PR) or extended partial-response (EPR) transfer function in the sampled readback signal. Precoder 124 typically employs a delay circuit which includes an exclusive OR (XOR) circuit to produce a binary write current waveform according to a selected partial-response signaling format. By way of example, precoder 124 may be described by a $1/(1-D^2)$ operation or by a $1/(1-D)$ operation, where D represents a unit delay operator. The precoder 124 mimics the desired partial-response transfer function characteristics by switching the write current such that each binary "1" in the data stream has a non-zero sample in the readback signal.

It is understood that precoder 124 may process the encoded customer data received from encoder 122 according to any of a number of partial-response transfer function specifications, such as a class-4 partial-response (PR4) signaling specification or an extended partial-response class-4 (EPR4) signaling specification. A further discussion of various PR4 and EPR4 signaling specification aspects may be found in commonly assigned U.S. Pat. Nos. 5,949,831, 5,857,002, and 5,442,492, each of which is hereby incorporated herein by reference in its entirety.

Precoder 124 is coupled to a precomp circuit 126 which provides the precoder output signal to a write circuit 128 in the form of a modulated binary pulse signal. The write circuit 128 provides the modulated write current signal to a write element of a read/write transducer for writing the processed customer data to the disk surface 130. As will be described in greater detail hereinbelow, the data written by the write circuitry shown in FIG. 4, according to the formatting methodology of the present invention, advantageously provides for a reduced pad size requirement.

Having described the various components and operations associated with writing data to a data storage disk according to an embodiment of the present invention, the following discussion describes various operations associated with reading data from data sectors having reduced pad sizes according to the present invention. A read element of a read/write transducer obtains an analog readback signal from the disk surface 130. The readback signal is applied to a variable gain amplifier (VGA) 132 and the amplified readback signal is applied to a low-pass filter 134. The filtered readback signal is converted to digital form by an analog-to-digital convert (ADC) 136. The converted signal produced by ADC 136 may, for example, provide for 64 possible 6 bit sampled values.

The samples of the ADC 136 are applied to a digital filter 138, such as a 10 tap finite impulse response (FIR) digital filter. The filtered signal produced at the output of digital filter 138 preferably conforms to a selected partial-response signal format (e.g., PR4 or EPR4). The filtered signal produced by the digital filter 138 is then communicated to a Viterbi detector 140.

The Viterbi detector 140 employs a Viterbi algorithm which is used to select the "best value" for an output based upon the minimization of the error term relative to an ideal sample value. Various known Viterbi or maximum likelihood detection algorithms may be employed in connection with the present invention. The Viterbi detector 140 produces an encoded binary data stream representative of the customer data which is subject to processing by a parity post-processor 141 and a decoder 143. The decoded binary data stream representative of the customer data is then transferred to the user via the head-disk controller and interface of the disk drive system.

Figure 5:
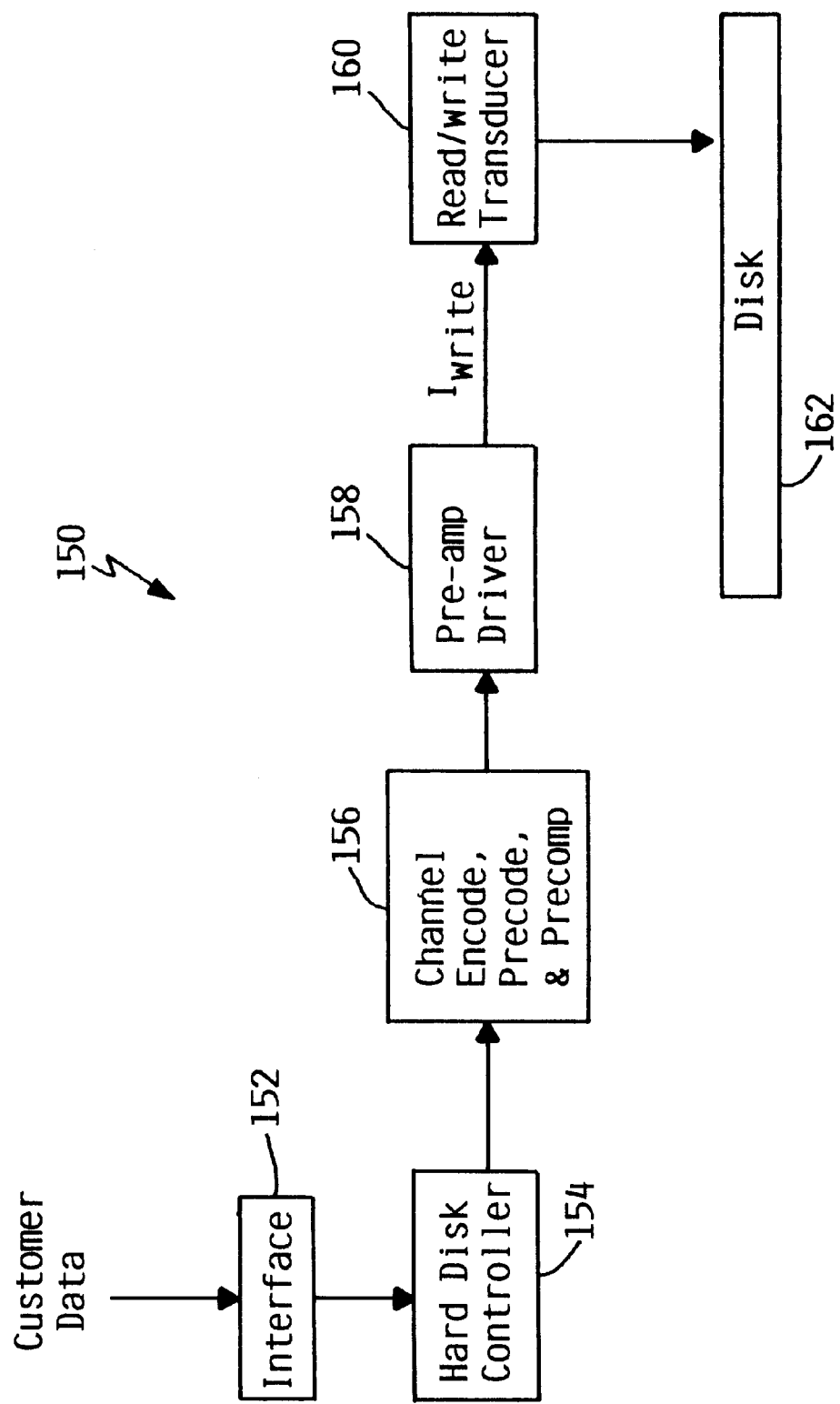
FIG. 5 illustrates a data channel and other components of a direct access storage device which embodies the present invention.

A formatting methodology according to an embodiment of the present invention will now be described in greater detail with reference to FIGS. 5–7. As is shown in FIG. 5, customer data is received at an interface 152 of a disk drive system which communicates the received customer data to a head-disk controller 154. Head-disk controller 154 coordinates the application of customer data to the write components of the channel 156, which is shown to include an encode, precode, and precomp capability. The customer data processed by the write channel components 156 is provided to a pre-amplifier driver circuit 158 that produces a write current signal, $I_{WRITE}$, which is transmitted to the read/write transducer 160. Read/write transducer 160 then writes the customer data to the surface of data storage disk 162.

Figure 6:
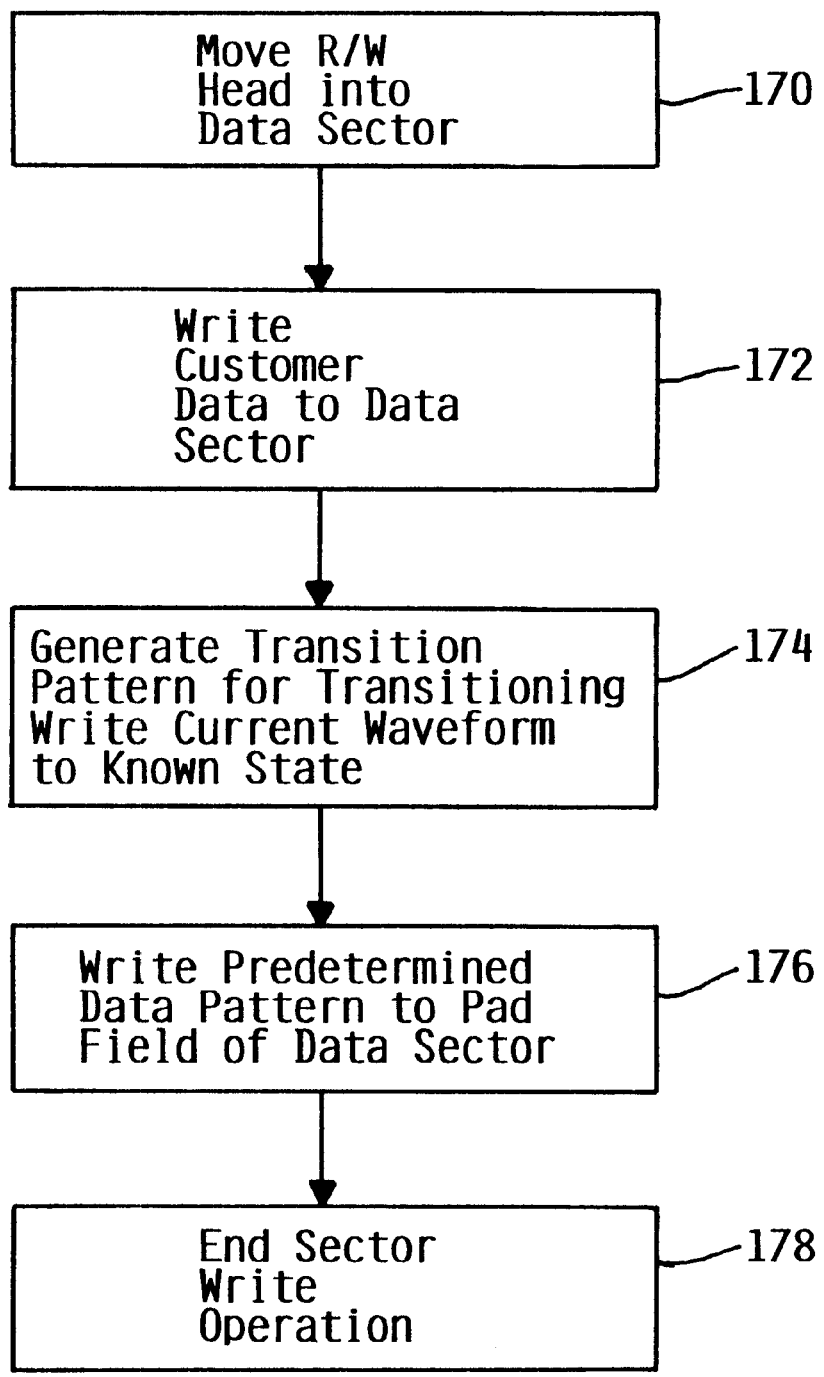
FIG. 6 illustrates various operations associated with performing a data write operation in accordance with the principles of the present invention.

According to the write operation steps depicted in FIG. 6, the read/write transducer 160 is moved 170 into proximity with a data sector defined in a data track of disk 162. The customer data is written 172 to the data sector using a write current waveform developed in the read/write transducer. In accordance with the principles of the present invention, a transition data pattern is generated 174 and used for transitioning the write current waveform from the state following writing of the data to a known state consistent with the coding constraints of the data channel.

Using the write current waveform of the known state, a predetermined data pattern is written 176 to the pad field of the data sector. The sector write operation is terminated 178 for the data sector. The write operations depicted in FIG. 6 are then repeated for subsequent data sectors, including data sectors which may be split by, for example, a servo sector.

Figure 7:
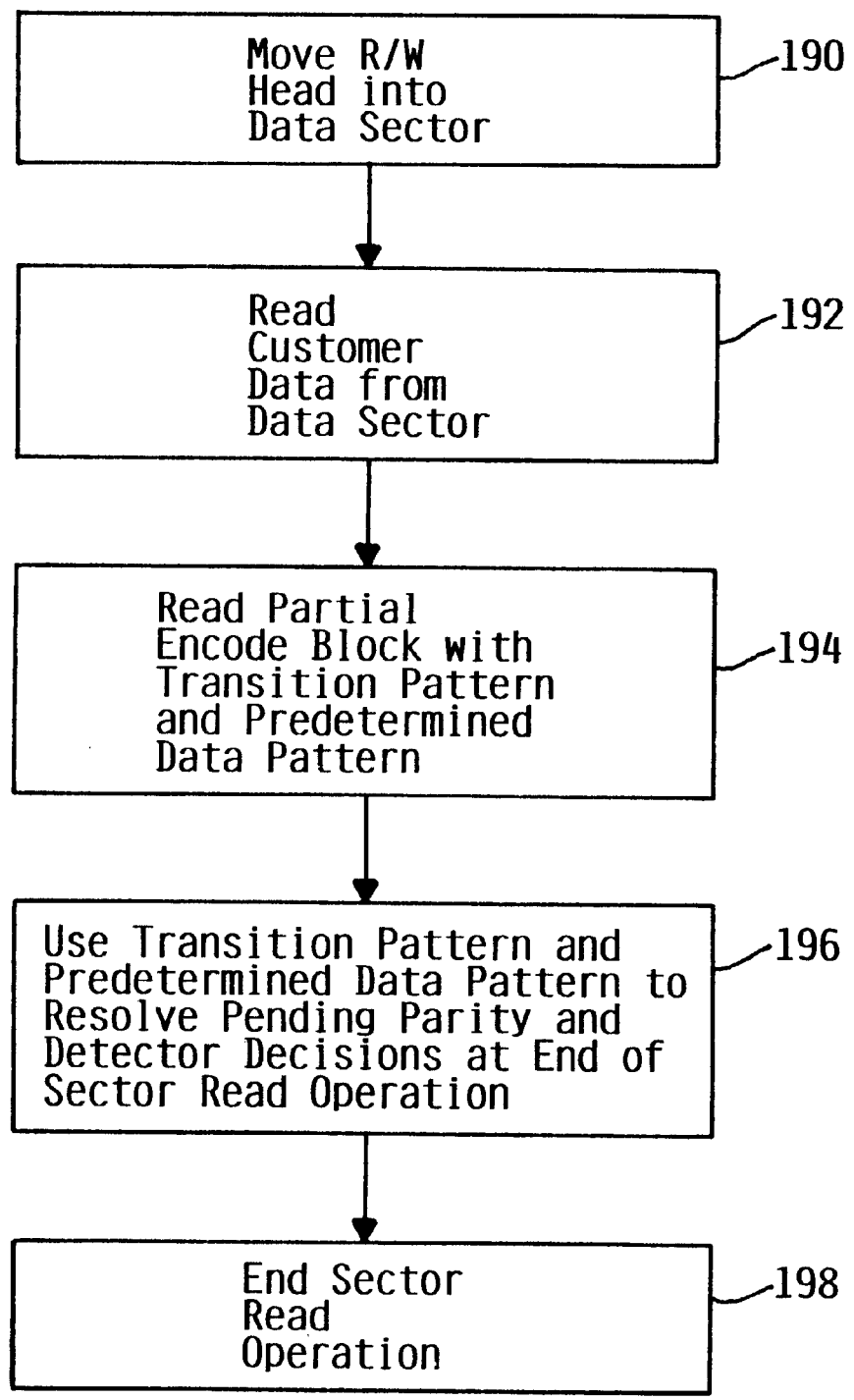
FIG. 7 illustrates various operations associated with performing a data read operation in accordance with the principles of the present invention.

FIG. 7 depicts several operations associated with performing a read operation with respect to a data sector formatted according to the data write operation depicted in FIG. 6. The read/write transducer 160 is moved 190 into proximity with a data sector, and customer data is read 192 from the data sector. After reading the customer data, the transition pattern and predetermined data pattern are read 194 from the pad field of the data sector. The transition and predetermined data patterns are used 196 to resolve pending parity and detector decisions at the end of the sector read operation. The sector read operation for the particular data sector is then terminated 198.

Figure 8:
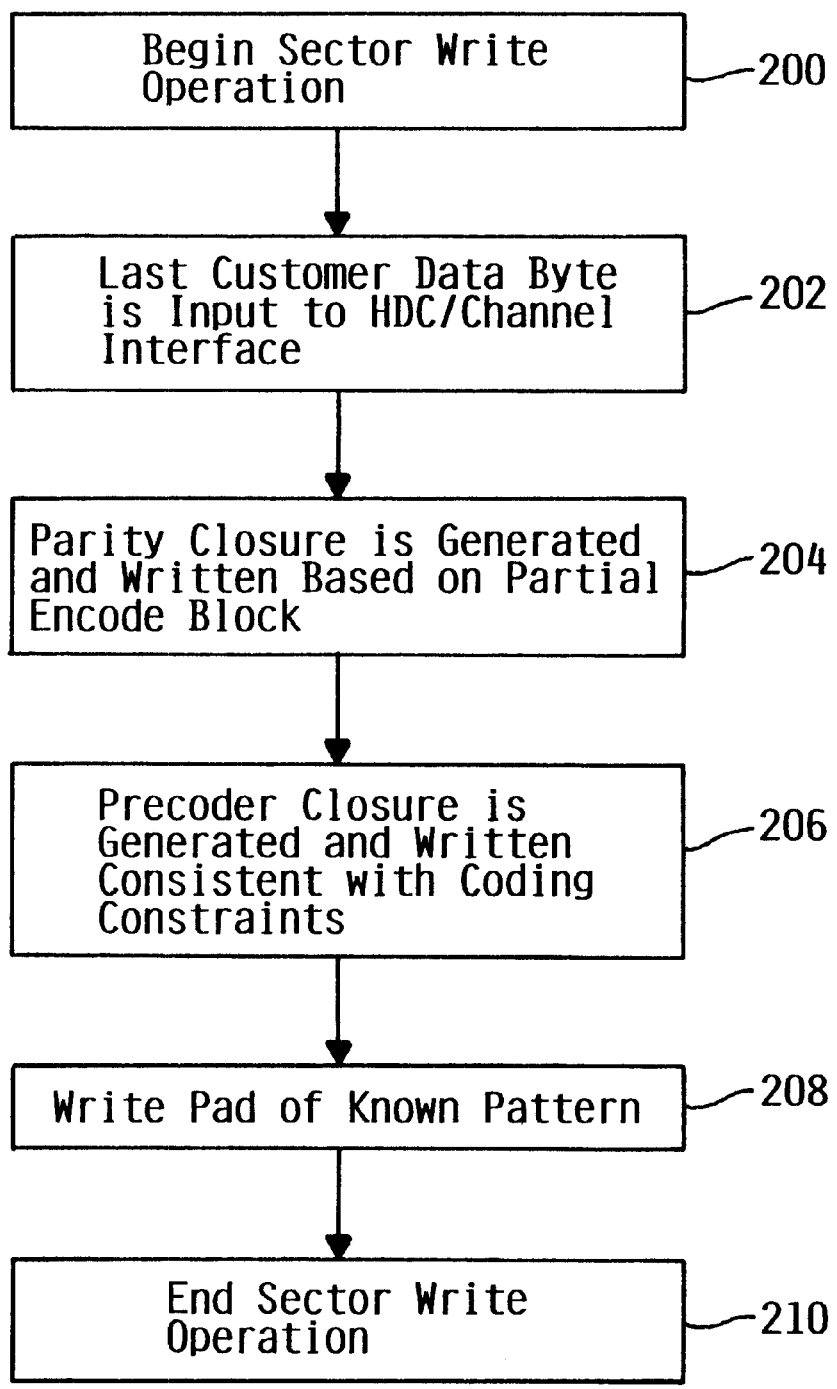
FIG. 8 illustrates various operations associated with a sector write operation in accordance with an embodiment of the present invention.
Figure 9:
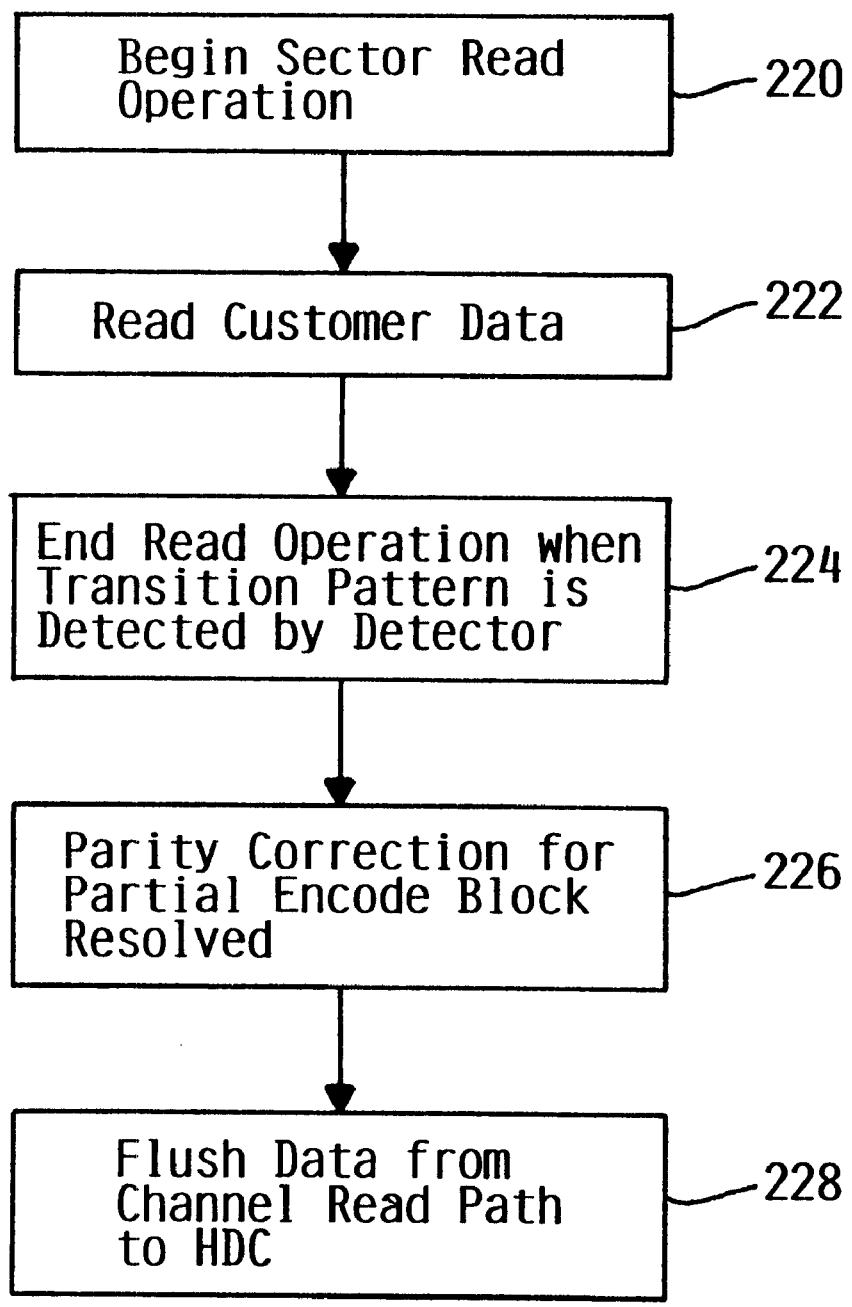
FIG. 9 illustrates various operations associated with a sector read operation in accordance with an embodiment of the present invention.

Turning now to FIGS. 8 and 9, there is illustrated various steps associated with writing and reading data to sectors of a data storage medium in accordance with another embodiment of the present invention. FIG. 8 depicts several operations associated with a data write operation in accordance with this embodiment. Upon initiating 200 a sector write operation for a particular data sector, customer data is written to the data field of the sector in a manner described previously hereinabove.

After the last customer data byte has been input to the head disk controller (HDC)/channel interface 202, parity closure is generated and written 204 based on the partial encode block. It may be assumed that either the channel has a counter to determine data field length or, alternatively, control of the read and write operations from the HDC exists with respect to a known clock count. Precoder closure is then generated and written 206 consistent with coding constraints of the data channel. It understood that after writing the last customer data byte to the data field, the write precoder is in one of several possible states.

Figure 10A:
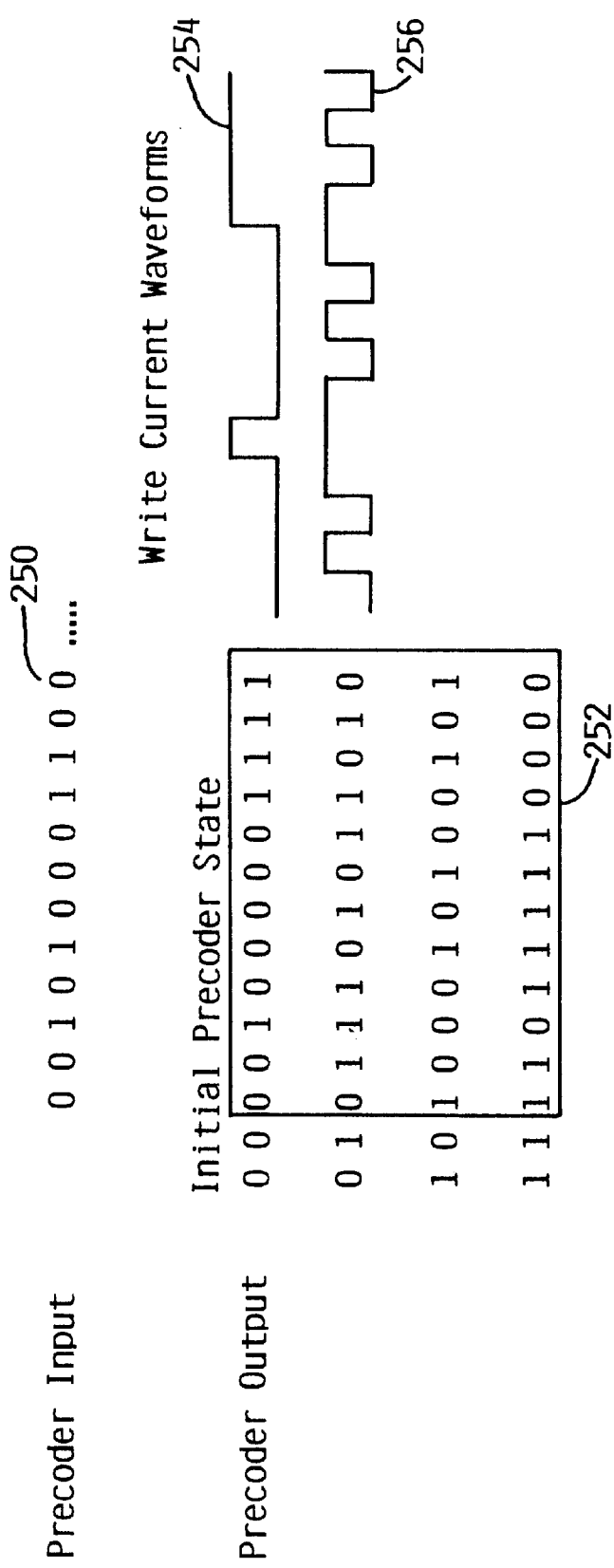
FIGS. 10A–10C illustrate exemplary precoder input and output data and corresponding current and readback waveforms associated with a write precoder circuit of the present invention.
Figure 10B:
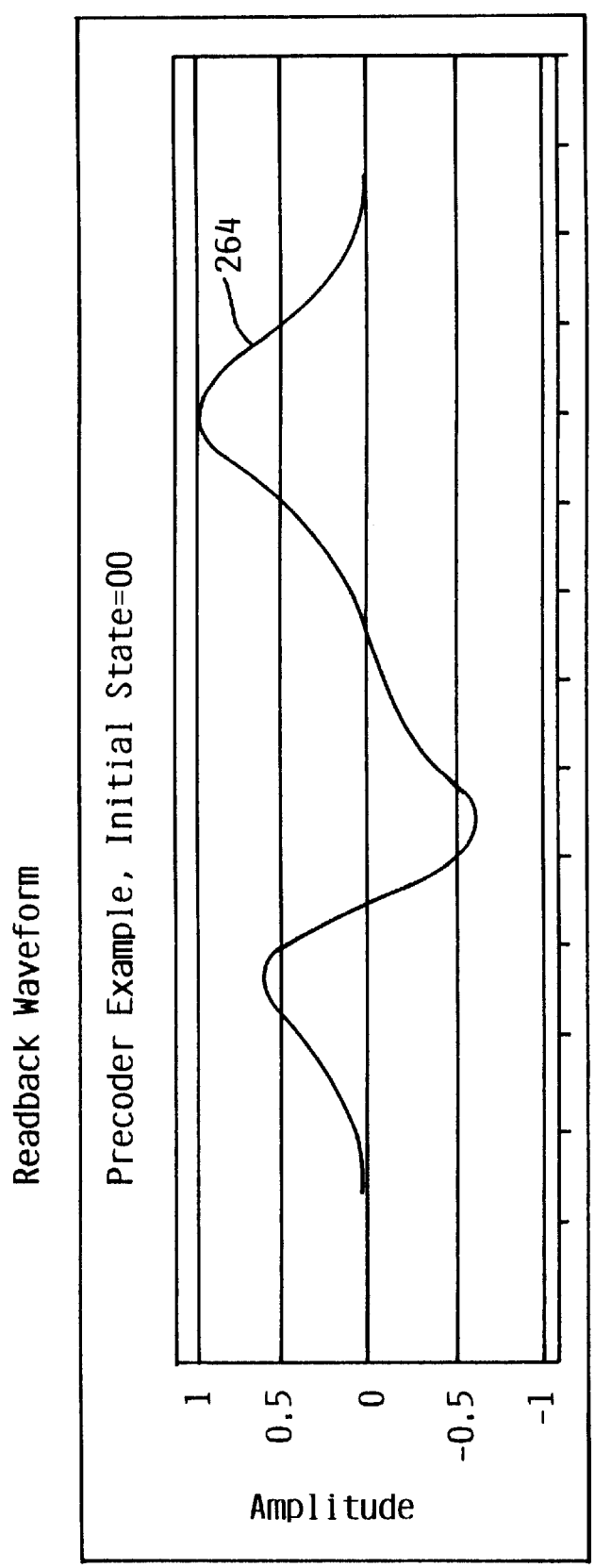
Figure 10C:
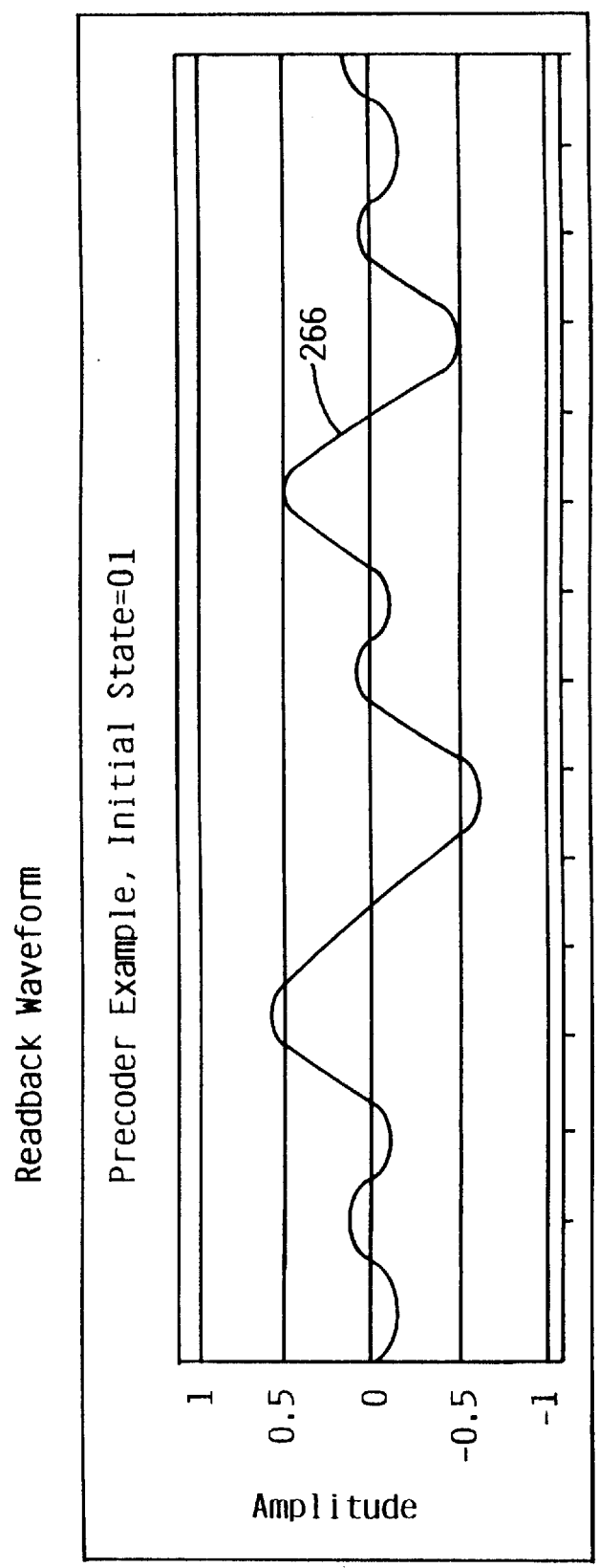

For example, the write precoder may be in one of four states, as is depicted by the write precoder circuit example shown in FIG. 10. FIG. 10 depicts encoded binary data 250 that is input to a precoder described by a $1/(1-D^2)$ operation as previously discussed. Table 252 depicts precoder output data associated with each of four possible initial precoder states. In the case of a write precoder having four possible initial states, defining a predetermined initial precoder state may be accomplished using 2 bits, although 1 bit may be sufficient for particular configurations.

FIG. 10 further illustrates write current waveforms 254, 256 associated with the first two row entries of precoder output data table 252, which is representative of initial precoder states of (0,0) and (0,1), respectively. FIG. 10 also shows readback waveforms 264 and 266 which correspond to write current waveforms 254 and 256, respectively.

In accordance with the present invention, the write precoder is transitioned to one of the four decoder states shown as initial precoder states in FIG. 10. For example, the write precoder may be transitioned to a state such that the write current is returned to a known condition, such as one of four phases of the sync field. The particular condition of the predetermined state is generally a matter of design choice. With the precoder reset to the known state, and referring again to FIG. 8, a "predetermined" data pattern corresponding to a "predetermined" initial precoder state is then written 208 to the pad field of the data sector. The sector write operation is then terminated 210.

To better appreciate the advantages of a track formatting approach consistent with the principles of the present invention, it is useful to review the manner by which a read operation is implemented using conventional data channel detection scheme. In order to decode the last bytes of data written to a data sector, conventional pad data is read following the customer data to provide sample values to the channel's Viterbi (trellis) and/or parity circuits to resolve pending decisions at the end of the data read operation.

Typically, this pad region is written with a sync field or other repeating pattern after the ECC data is written to the channel. It is understood that a Viterbi or trellis decoder used during readback signal detection exhibits a transfer function that is inverse to that of the write precoder and equalization circuitry.

Resolving pending decisions at the end of the data read operation according to conventional Viterbi/trellis detection approaches involves confirming, for example, a +1 state which cannot be confirmed until a −1 state has been detected. When confirmed, a +1 or −1 value becomes a confirmed maximum or minimum and results in the output of a "1" value from the Viterbi detector. An example of a tentative pending decision involves 0 values which are only confirmed by locating a +1 or a −1 value, which can result in lengthy latencies. A sufficient number of samples must be read in order to close-out the decision path for such a tentative pending decision.

FIG. 9 depicts several operations associated with a sector read operation according to this illustrative embodiment. During a sector read operation 220, customer data is read 222 followed by operations required to resolve pending decisions at the end of the data read operation. In contrast to a conventional approach, such as that described above, internal read circuit operations, according to the embodiment of FIG. 9, end when the transition pattern is read and detected by the data channel's detector (e.g., Viterbi detector) at which time substitutions of samples representing the known or predetermined pattern begins. This results in reduced latency to restart successive read or servo operations.

It is understood that latency time is still required to output customer data over the NRZ (non-return to zero) bus. This assumes that either the channel has a counter to determine data field length or control of write and read operations from the HDC exist to a known clock count. Because the read gate ending can be determined, the read process ends earlier than in conventional approaches.

Following closure of the read operation, parity correction for the partial encode block is resolved 226. A sector read operation concludes with flushing 228 data from the channel read path to the HDC. It is noted that the selection of the precoder closure bits or predetermined data pattern written to the pad field as depicted in FIG. 8 should be selected to meet both detector and parity constraints.

The foregoing description of the various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of transferring data between a read/write transducer coupled to a data channel and a data storage medium, the method comprising:

writing, using a write current waveform developed in the read/write transducer, data to a data sector of the data storage medium;

generating a transition pattern used for transitioning the write current waveform from a state following writing of the data to a known state consistent with coding constraints of the channel; and writing a predetermined data pattern associated with the known state of the write current waveform to a pad field of the data sector.

2. The method of claim 1, wherein the coding constraints are consistent with encoding and decoding requirements of the channel.

3. The method of claim 1, wherein the coding constraints comprise parity constraints.

4. The method of claim 1, wherein the coding constraints comprise parity constraints and precoder constraints.

5. The method of claim 1, wherein the predetermined data pattern is a synchronization or repeating data pattern.

6. The method of claim 1, wherein the predetermined data pattern comprises all logical ones or all logical zeros.

7. The method of claim 1, wherein the predetermined data pattern comprises a data pattern that facilitates detector and parity post-processor closure decisions.

8. The method of claim 1, further comprising using the transition pattern and the predetermined data pattern to resolve detector and parity post-processor closure decisions during a sector read operation.

9. An apparatus for transferring data to and from a data storage medium, the apparatus comprising:

a controller coupled to an interface for receiving customer data;

a data channel comprising a write circuit;

a read/write transducer coupled to the data channel; and a write coding circuit coupled to the controller and the write circuit, the write coding circuit switching write current of the read/write transducer to code the data according to a selected partial response signaling format when writing the data to a data sector of the data storage medium, the write coding circuit generating a transition pattern used for transitioning the write current from a state following writing of the data to a known state consistent with coding constraints of the channel, and the read/write transducer writing a predetermined data pattern associated with the known state of the write current to a pad field of the data sector.

10. The apparatus of claim 9, wherein the write coding circuit codes the data according to a partial response class-4 signaling format or an extended partial response class-4 signaling format.

11. The apparatus of claim 9, wherein the data channel comprises a parity post-processor, further wherein the coding constraints are consistent with parity requirements of the parity post-processor.

12. The apparatus of claim 9, wherein the write coding circuit comprises an encoder and a precoder, further wherein the coding constraints are consistent with coding requirements of the encoder and precoder.

13. The apparatus of claim 9, wherein the data channel comprises a detector and a parity post-processor, further wherein the predetermined data pattern comprises a data pattern that facilitates detector and parity post-processor closure decisions.

14. The apparatus of claim 9, wherein the data channel further comprises a parity post-processor and a detector, the parity post-processor and detector using the transition and predetermined data patterns to resolve block code constraints and detector decisions, respectively, at the end of a sector read operation.

15. The apparatus of claim 9, wherein the predetermined data pattern is a synchronization data pattern or a repeating data pattern.

16. The apparatus of claim 9, wherein the predetermined data pattern comprises all logical ones or all logical zeros.

17. A data storing system, comprising:

a data storage disk;

a plurality of transducers each supported by a support structure in proximity with the disk;

an actuator that provides relative movement between the transducers and the disk; and circuitry for transferring data to and from a data storage disk, the circuitry comprising:
    a controller coupled to an interface for receiving customer data;
    a data channel comprising a write circuit;
    a read/write transducer coupled to the data channel; and
    a write coding circuit coupled to the controller and the write circuit, the write coding circuit switching write current of the read/write transducer to code the data according to a selected partial response signaling format when writing the data to a data sector of the data storage medium, the write coding circuit generating a transition pattern used for transitioning the write current from a state following writing of the data to a known state consistent with coding constraints of the channel, and the read/write transducer writing a predetermined data pattern associated with the known state of the write current to a pad field of the data sector.

18. The system of claim 17, wherein the data channel comprises a parity post-processor, further wherein the coding constraints are consistent with parity requirements of the parity post-processor.

19. The system of claim 17, wherein the write coding circuit comprises an encoder and a precoder, further wherein the coding constraints are consistent with coding requirements of the encoder and precoder.

20. The system of claim 17, wherein the data channel comprises a detector and a parity post-processor, further wherein the predetermined data pattern comprises a data pattern that facilitates detector and parity post-processor closure decisions.

21. The system of claim 17, wherein the data channel further comprises a parity post-processor and a detector, the parity post-processor and detector using the transition and predetermined data patterns to resolve block code constraints and detector decisions, respectively, at the end of a sector read operation.

22. The system of claim 17, wherein the predetermined data pattern is a synchronization data pattern or a repeating data pattern.

23. The system of claim 17, wherein the predetermined data pattern comprises all logical ones or all logical zeros.

* * * * *